(No Model.)

C. POTEE.
CLEARER ATTACHMENT FOR HARVESTER CUTTERS.

No. 334,723. Patented Jan. 19, 1886.

Witnesses:
E. C. Wurdeman
E. E. Masson

Inventor:
Claudius Potee,
by C. C. Shepherd.
atty.

UNITED STATES PATENT OFFICE.

CLAUDIUS POTEE, OF SOMERFORD, OHIO.

CLEARER ATTACHMENT FOR HARVESTER-CUTTERS.

SPECIFICATION forming part of Letters Patent No. 334,723, dated January 19, 1886.

Application filed July 18, 1885. Serial No. 172,025. (No model.)

*To all whom it may concern:*

Be it known that I, CLAUDIUS POTEE, a citizen of the United States, residing at Somerford, in the county of Madison and State of Ohio, have invented a certain new and useful Improvement in Attachments for Harvesting-Machines, of which the following is a specification.

My invention relates to improvements in attachments for harvesting-machines, and more particularly to attachments for the finger-bar; and the objects of my invention are, first, to provide at a low cost of manufacture an attachment for the finger-bar of harvesting-machines, adapted, when weedy places are reached, to be made to project in front of the knives and press the weeds to the ground, thus preventing the knives from being dulled or their action retarded by coming in contact with the weeds; second, to provide a guard against injury to persons who may be in front of the machines. I accomplish these objects in the manner illustrated in the accompanying drawings, in which—

Figure 1:
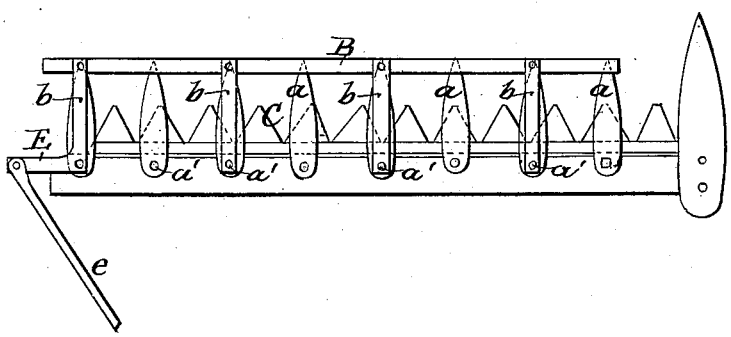
Figure 2:
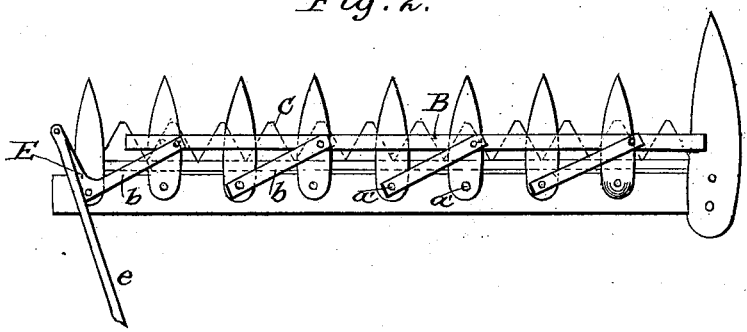
Figure 3:
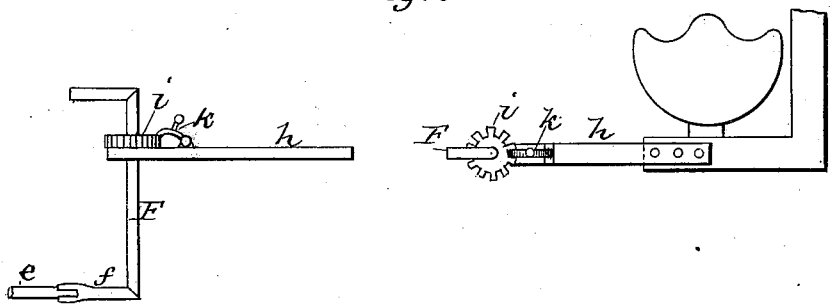

Figure 1 is a view of the under side of a finger-bar having my improvement thereon in position for use. Fig. 2 is a similar view showing my improvement folded to the rear. Fig. 3 represents in side view and plan a portion of the frame to which the operating-lever is attached.

Similar letters refer to similar parts throughout the several views.

A represents a finger-bar, such as is in common use on harvesting-machines, $a$, the guards, and $a'$ the bolts securing the same to the bar A.

B represents my attachment, consisting of a transverse metal bar, to the under side of which are loosely pivoted, at regular intervals, the outer ends of arms $b$, which, when extended, project to the rear at right angles with the bar B, and are loosely pivoted by means of the guard-bolts $a'$, or of separate bolts, to the under side of the finger-bar, and immediately above the points where the fingers are bolted to the bar. The arm $b$, near the inner end of the cutter-bar, is formed with a right-angle projection from its rear end, and, being pivoted at its angle, forms a bell-crank lever, E. To this lever E may be attached a rod, $e$, leading to a point near the seat of the machine, and is loosely secured to a short arm, $f$, projecting from near the lower extremity of an upright rod or lever, F, which has its lower bearing in the lower frame-work of the machine, and its upper bearing in a metal arm, $h$, projecting from the upper frame-work. The rod or lever F projects in the form of an angular handle slightly above the bearing-arm $h$, and is provided with a ratchet-wheel, $i$, which rests on said bearing-arm. A dog, $k$, is pivoted to the arm $h$, which is adapted to engage with the teeth on the wheel $i$. When not in use, the bar B is, by means of its pivoted arm $b$ and lever E, folded to the rear of the knives C, in front of the finger-bar and beneath the guards, thus being in a position to prevent its interference with the free working of the machine. When a weedy spot is reached, the driver may, by turning the lever F, which operates the rod $e$ and lever E, project the bar B to the front of the knives in a line parallel with the finger-bar, so that the weeds, which otherwise would be brought in contact with the knives and operate to dull and choke the same, will be pressed to the ground by contact with the bar B, and the knives allowed to pass over them. The dog $k$ on the bearing arm $h$, engaging with the teeth on the ratchet-wheel $i$, locks the bar in position, so that the force of the weeds pressing against the bar B may not cause it to fold to the rear.

It will be seen that my invention may be manufactured and attached to the machines now in use at a slight expense.

Having now fully described my invention, what I claim, and desire to secure by Letters Patent, is—

An attachment for harvesting-machines, consisting of metal bar B, attached to the finger-bar by loosely-pivoted arms $b$, and having a lever, E, said bar being adapted to be folded to the rear of the knives C, or projected to the front by means of an operating lever and rod, substantially as and for the purpose specified.

CLAUDIUS POTEE.

Witnesses:
A. U. POTEE,
CHARLES BUTTERFIELD.